US006421395B1

(12) United States Patent
Wei

(10) Patent No.: US 6,421,395 B1
(45) Date of Patent: Jul. 16, 2002

(54) TERMINATION OF CODED OR UNCODED MODULATION WITH PATH-ORIENTED DECODER

(75) Inventor: Lee-Fang Wei, Lincroft, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/247,704

(22) Filed: Feb. 9, 1999

(51) Int. Cl.⁷ ............................................. H04L 23/02
(52) U.S. Cl. ...................... 375/265; 375/295; 375/340
(58) Field of Search ............................. 375/259, 261, 375/341, 265, 262, 298; 714/746, 755, 757, 759, 762, 786, 791, 794, 795

(56) References Cited

U.S. PATENT DOCUMENTS

| | | | | |
|---|---|---|---|---|
| 5,185,763 A | * | 2/1993 | Krishnan | 375/262 |
| 5,548,615 A | * | 8/1996 | Wei | 375/281 |
| 5,596,604 A | * | 1/1997 | Cioffi et al. | 375/260 |
| 5,621,761 A | * | 4/1997 | Heegard | 375/265 |
| 5,751,739 A | * | 5/1998 | Seshadri et al. | 714/746 |
| 5,805,203 A | * | 9/1998 | Horton | 348/12 |
| 5,862,155 A | * | 1/1999 | Lomp et al. | 371/43.4 |
| 5,987,070 A | * | 11/1999 | Fimoff et al. | 375/286 |
| 5,995,551 A | * | 11/1999 | McCallister et al. | 375/265 |
| 6,097,764 A | * | 8/2000 | McCallister et al. | 375/298 |
| 6,131,180 A | * | 10/2000 | Ramesh | 714/790 |
| 6,158,041 A | * | 12/2000 | Raleigh et al. | 714/792 |
| 6,160,854 A | * | 12/2000 | Heegard et al. | 375/265 |

OTHER PUBLICATIONS

U.S. patent Ser. No. 5,214,656, filed on Dec. 13, 1990 and issued on May 25, 1993 to Chung et all.
Network and Customer Installation Interface—Assymmetric Digital Subscriber Line (ADSL) Metallic Interface, ANSI T1.413–1995.
U.S. patent application Ser. No. 09/049,268 filed Mar. 27, 1998, entitled "Path–Oriented Decoder Using Refined Receiver Trellis Diagram".
U.S patent application Ser. No. 09/023,063 filed Feb. 12, 1998, entitled "Path–Oriented Decoder for Signal–Dependent Noise".

* cited by examiner

Primary Examiner—Chi Pham
Assistant Examiner—Emmanuel Bayard
(74) Attorney, Agent, or Firm—Geraldine Monetleone; John F. McCabe

(57) ABSTRACT

A portion of signal points that appear at predetermined positions in a signal point stream and that benefit less from a particular form of error immunity—e.g., conversion gain—are transmitted in such a way that their robustness against errors is at least as great as that of the signal points that benefit more therefrom. In preferred packet transmission embodiments of the invention, the ending signal points of a packet are transmitted using a signal point constellation that has fewer signal points than the constellation that is used for the other signal points in the packet.

41 Claims, 13 Drawing Sheets

2-QAM

R

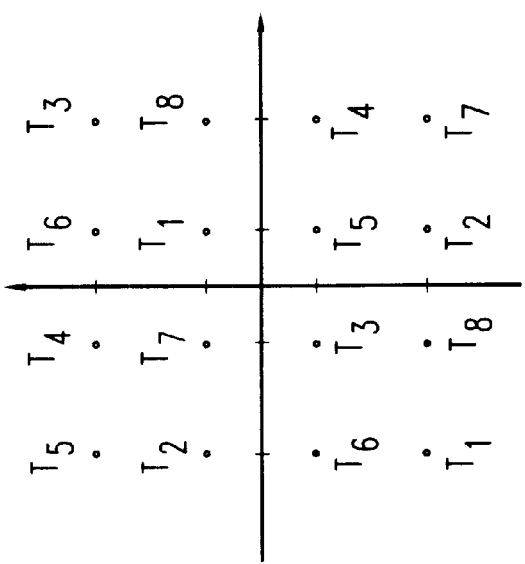
FIG. 16   16-QAM
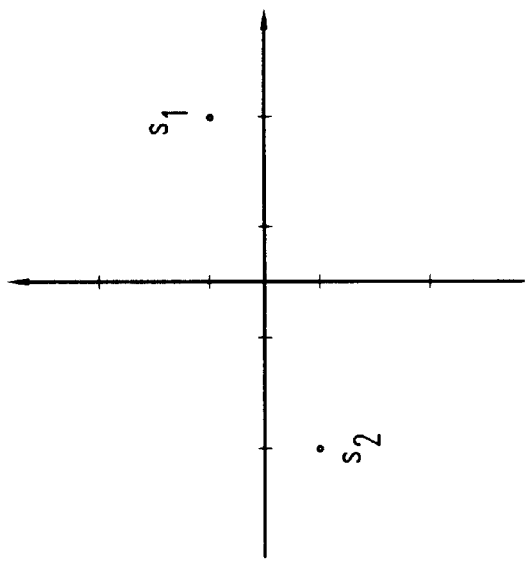
FIG. 14   2-QAM

TERMINATION OF CODED OR UNCODED MODULATION WITH PATH-ORIENTED DECODER

BACKGROUND OF THE INVENTION

The present invention relates to data communication and, in particular embodiments, to the communication of data over a channel exhibiting intersymbol interference.

An intersymbol interference (ISI) channel is one in which, as a result of distortion in the channel, the signal energy of a signal point transmitted in one signaling interval becomes dispersed over a number of adjacent signaling intervals. The dispersed energy combines with signal points transmitted in the adjacent intervals and thus constitutes a source of noise in those other intervals. When the level of ISI is small, a so-called linear equalizer is effective in mitigating against it. However, if the ISI is severe, other, more powerful techniques must be brought into play. Typically these techniques make use of a decision feedback equalizer (DFE). A DFE estimates the amount of ISI in a given received signal point and subtracts the ISI estimate therefrom to arrive at an ISI-compensated signal point from which a decision is made as to the identity of the transmitted signal point.

One such technique is taught in my co-pending U.S. patent application Ser. No. 09/049268 filed Mar. 3, 1998 and entitled "Path-Oriented Decoder Using Refined Receiver Trellis Diagram." The ISI phenomenon is manifested in that some of the energy of the signal point transmitted during a signaling interval is dispersed into adjacent signaling intervals. The technique described in that patent application uses a so-called path-oriented joint decoder/DFE with a refined receiver trellis diagram to in effect return to each signal point at least a portion of the signal energy thereof that was dispersed to other signaling intervals. This provides an improvement in error immunity referred to as a "conversion gain".

SUMMARY OF THE INVENTION

The aforementioned conversion gain is not fully achieved for the last several signal points of any given transmission. The reason for this is that there is a smaller number of subsequent signaling intervals from which the dispersed signal energy of these last signal points can be gathered and returned to the respective signal points. Indeed, that smaller number may be zero relative to the very last signal point. The decoding of these ending signal points is therefore less reliable than that of the signal points for which conversion gain was secured. This problem can be overcome by artificially creating additional signaling intervals through the transmission of dummy signal points, thereby providing an opportunity for the dispersed energy of the actual data signal points to be gathered as discussed above.

This above-described technique is quite workable in a continuous transmission environment—in which a stream of many millions of bits may be transmitted—because the resulting reduction in bandwidth efficiency (average number of useful data bits per signaling interval) will be negligible. However, for packet transmission, in which the signal points are transmitted in discrete packets each containing a relatively small number of signal points (typically on the order of several hundreds), the introduction of dummy signal points may well have an undesirably large affect on the bandwidth efficiency. On the other hand, to not transmit dummy signal points means that the decoding of the last few signal points will be less reliable than that of the preceding signal points. This is quite disadvantageous in a packet transmission environment because the performance of the ending signal points relative to the other signal points would then dominate the overall error performance, given that, typically, an entire packet is flagged as being in error even if the decoding of only one of its signal points is in error.

The present invention is directed to a technique for use in a data transmission environment in which, as per the discussion above, a portion of the signal points in a signal point stream benefit from a particular form of error immunity enhancement—e.g., the aforementioned conversion gain—while other signal points benefit less therefrom, including not benefiting at all. In accordance with the principles of the invention, signal points appearing at predetermined positions in the signal point stream that benefit less from the error immunity enhancement are transmitted in such a way that their robustness against errors is at least as great as that of the signal points that benefit more therefrom. Thus the invention eliminates the above-described problem of the ending signal points dominating the overall error rate performance of, for example, a packet transmission signaling scheme.

In the disclosed illustrative packet transmission embodiments of the invention, the ending signal points of a packet are transmitted using a signal point constellation that has fewer signal points than is used for those which precede them so that the ending signal points can be further apart from one another in signal space. As a result, more noise may be tolerated and the overall error performance of the ending signal points can be made no worse than that of the other signal points. Thus, essentially the same overall packet error rate as that which is achieved for continuous transmission can be achieved for packet transmission because (a) the signal points that occur earlier in the packet benefit from conversion gain and (b) another form of enhanced error immunity is provided for the ending signal points which do not benefit from conversion gain. Furthermore, the invention significantly ameliorates the reduction in bandwidth efficiency that would be occasioned by the use of dummy signal points as described above.

The invention may be used in signaling schemes which utilize coded modulation such as convolutional coding. When such coding is used in packet transmission environments (or other environments in which the data is transmitted in successive disjoint communications), it is advantageous to terminate the code. This means that the transmitter coder is brought to a predetermined terminating state in order to avoid significant decoding delay in the receiver while yet preserving for all of the signal points in the packet the error immunity afforded by the code. Code-termination alone, however, does not always provide for the above-discussed conversion gain. Therefore, in preferred implementations of coded modulation transmission systems which incorporate the present invention, first the code is terminated and then a number of ending signal points are transmitted pursuant to the principles of the invention as described above.

The principles of the invention may also be used in a continuous transmission environment and are applicable, in particular, to those arrangements in which the path-oriented joint decoder/DFE is employed with modulation schemes utilizing relatively large constellations (e.g., larger than a 16-QAM or 32-QAM). In such arrangements, the ISI components are far stronger than when the constellation has fewer signal points and, as a result, once a decoding error is made, the error propagation is more severe. Therefore, to confine the error propagation, it is desirable to divide the continuous transmission into packets and then to apply the principles of the invention to each packet.

BRIEF DESCRIPTION OF THE DRAWING

FIG. 14 shows an illustrative 2-QAM signal point constellation on which the path-termination portion of FIG. 15 is based.

FIG. 16 shows the constellation of FIG. 13 partitioned into eight receiver subsets.

DETAILED DESCRIPTION

To better understand the present invention, it is helpful to first discuss the approaches disclosed in my aforementioned co-pending application that provide for improved decoding reliability for intersymbol interference ("ISI") channels.

Figure 1:
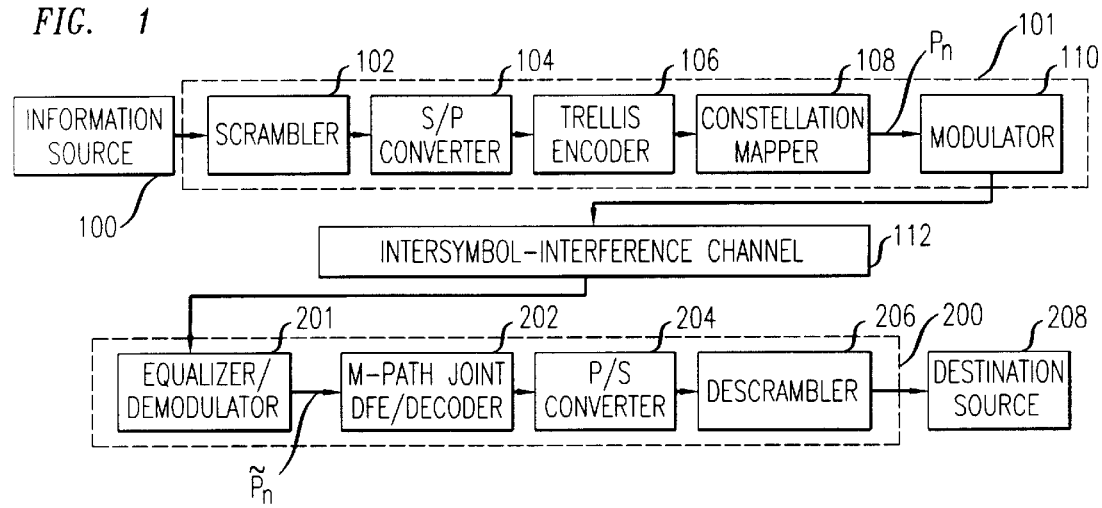
FIG. 1 shows a generalized block diagram of a communication system in which the present invention is illustratively used.

A communication system in which this approach, as well as the present invention, are illustratively used is shown in FIG. 1. A sequence of bits generated from an information source 100 (such as a PC or computer terminal) is input to a transmitting modem 101 and, in particular, to a scrambler 102 thereof, which randomizes the bits in a conventional manner. The serial bit stream output from scrambler 102 is provided to a serial-to-parallel (S/P) converter 104. The bits provided in parallel at the output of converter 104 are applied to trellis encoder 106, which processes them in a manner to be described and provides a number of trellis encoded output bits to constellation mapper 108. (In arrangements in which the modulation is uncoded, as described in further detail below, trellis encoder 106 is not used.)

As described in further detail hereinbelow, constellation mapper 108 provides to modulator 110 channel signal point $P_n$ during an $n^{th}$ so-called signaling interval of duration T seconds. It does this by selecting the signal points from predetermined constellations of signal points, illustratively the constellation of FIG. 3. The selected signal point is provided to a conventional pulse-shaping filter (not shown) and then to modulator 110. Modulator 110 modulates the sequence of selected signal points and provides a modem output signal onto a communication channel 112.

In channel 112 the transmitted signal is subjected to intersymbol interference, or ISI, and so-called additive Gaussian noise. The resulting noise- and ISI-corrupted signal is ultimately delivered to receiving modem 200.

Within receiving modem 200, the received signal is processed in a conventional manner by equalizer/demodulator 201 to generate a corrupted signal point $\tilde{P}_n$ from which some of the intersymbol interference—principally the so-called precursors—has been removed. Signal point $\tilde{P}_n$ is then processed by M-path joint DFE/decoder 202 to further equalize the signal-principally to remove so-called postcursors—and to decode the signal to recover the transmitted signal point. In a manner described in detail hereinbelow, decoder 202 arrives at a final decisions $\hat{P}_n$ as to the value of the transmitted signal point. The output of decoder 202, comprising the data bits corresponding to $\hat{P}_n$ is provided to parallel-to-serial (P/S) converter 204, descrambled in a conventional manner by descrambler 206, and received by destination source 208 (which may be, for example, a mainframe computer or another PC).

Figure 2:
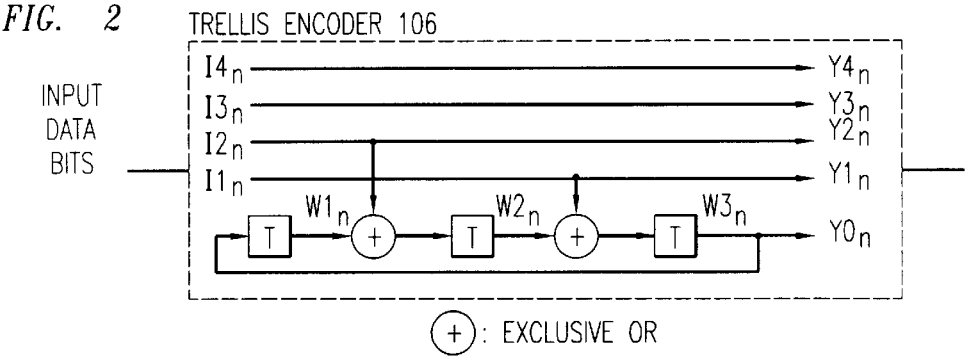
FIG. 2 shows an illustrative embodiment of a trellis encoder used in the communication system of FIG. 1.

FIG. 2 is an illustrative implementation of an N-state trellis encoder 106, with N=8. The input to trellis encoder 106 from S/P converter 104 comprises the four data bits $I1_n$ through $I4_n$ received during signaling interval n. Trellis encoder 106 is illustratively a systematic encoder, meaning that each of its input data bits passes through the encoder unchanged to become one of its output bits. Trellis encoder 106 has one additional output bit $Y0_n$-which is the so-called redundant bit. In particular, encoder 106 is a finite-state machine in which the encoder state, $W1_n W2_n W3_n$, is defined by the bit values currently stored in its three T-second delay elements. As seen from the FIG., the value of bit $Y0_n$ is a function of the current encoder state.

More particularly, the three T-second delay elements are interconnected through two exclusive-OR gates as shown. Since each of the three delay elements can contain a binary "0" or "1" at any point in time, the trellis encoder has $N=2^3=8$ so-called states and indeed is referred to as an 8-state encoder. As each new set of values of $I1_n$ and $I2_n$ arrives for each new signaling interval, the bit values stored in the delay elements are updated, thereby advancing, or transitioning, the encoder to a new state, $W1_{n+1} W2_{n+1} W3_{n+1}$. This process is repeated for a succession of signaling intervals, with the encoder transitioning through a sequence of states.

Figure 3:
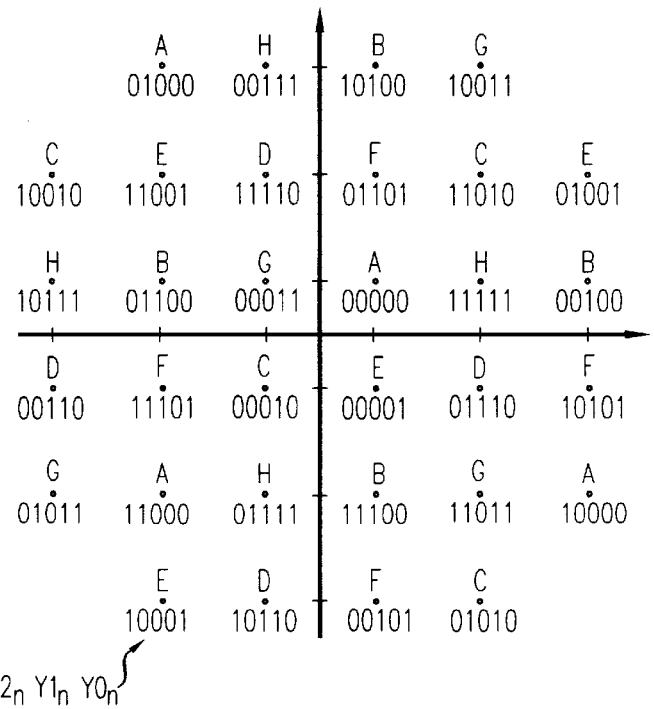
FIG. 3 shows an illustrative thirty-two signal point constellation partitioned into eight transmitter subsets.

Constellation mapper 108 uses the values of bits Y0$_n$ through Y4$_n$ to determine which signal point of a predetermined 32-signal-point constellation should be transmitted as a signal point P$_n$. That constellation is the one shown in FIG. 3. The constellation is comprised of eight transmitter subsets of signal points A through H, each in turn comprised of four signal points as shown. The values of bits Y0$_n$ through Y2$_n$ identify from which of the eight transmitter subsets signal point P$_n$ is to be taken. The values of bits Y3$_n$ and Y4$_n$ select as P$_n$ a particular one of the four signal points within the identified transmitter subset. The structure of encoder 106 is such that not all sequences of states can actually occur. As a result, not all sequences of the three-bit combination Y2$_n$Y1$_n$Y0$_n$ can actually occur. The overall consequence is that the signal points of the constellation of FIG. 3 are allowed to be taken only from certain sequences of transmitter subsets. This constraint is what allows the received signal points in a trellis coded system to be decoded in a way which provides enhanced immunity to noise and other channel impairments.

Figure 4:
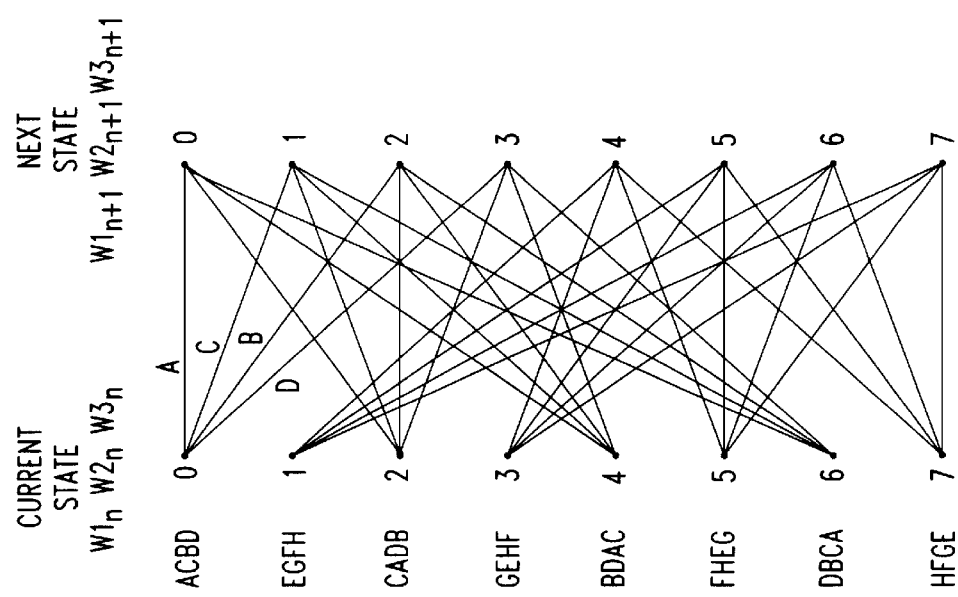
FIG. 4 shows a transmitter trellis diagram that represents the operation of the trellis encoder of FIG. 2.

The eight-state trellis diagram of FIG. 4 illustrates the operation of trellis encoder 106 from another perspective. The eight states of trellis encoder 106 are denoted 0 through 7. The two vertical lines of points in FIG. 4 respectively represent the possible current and next encoder states. The trellis diagram defines, for each current encoder state, to which next states the encoder is allowed to transition. The lines, or branches, connecting various pairs of states indicate the allowed state transitions. For example, the encoder can transition from current state 0 to any one of next states 0, 1, 2 or 3 but not to any other state.

Every branch in FIG. 4 bears a label indicating from which one of transmitter subsets A through H the signal point being generated is to come. With respect to state 0, the labels are shown adjacent to the corresponding branches but, for drawing simplicity, the labels for the branches emanating from the other states are only shown in the columns to the left of the trellis. Thus, for example, the branches connecting state I to states 4, 5, 6 and 7 are labeled E, G, F, and H, respectively.

Assume that the current state of the encoder is 0 and that, after receiving a new pair of input bits Y1$_n$ and Y2$_n$, the encoder is now in state 1. This means that the next signal point to be output is to come from transmitter subset C since the line connecting state 0 in the left column to state I in the right column is labeled C. With the encoder now in state 1 (the new current encoder state), the encoder can transition to any of states 4, 5, 6 or 7, and thus the next signal point is constrained to come from one of the transmitter subsets E, G, F, or H, depending on which of those states the encoder has transitioned to.

Figure 5:
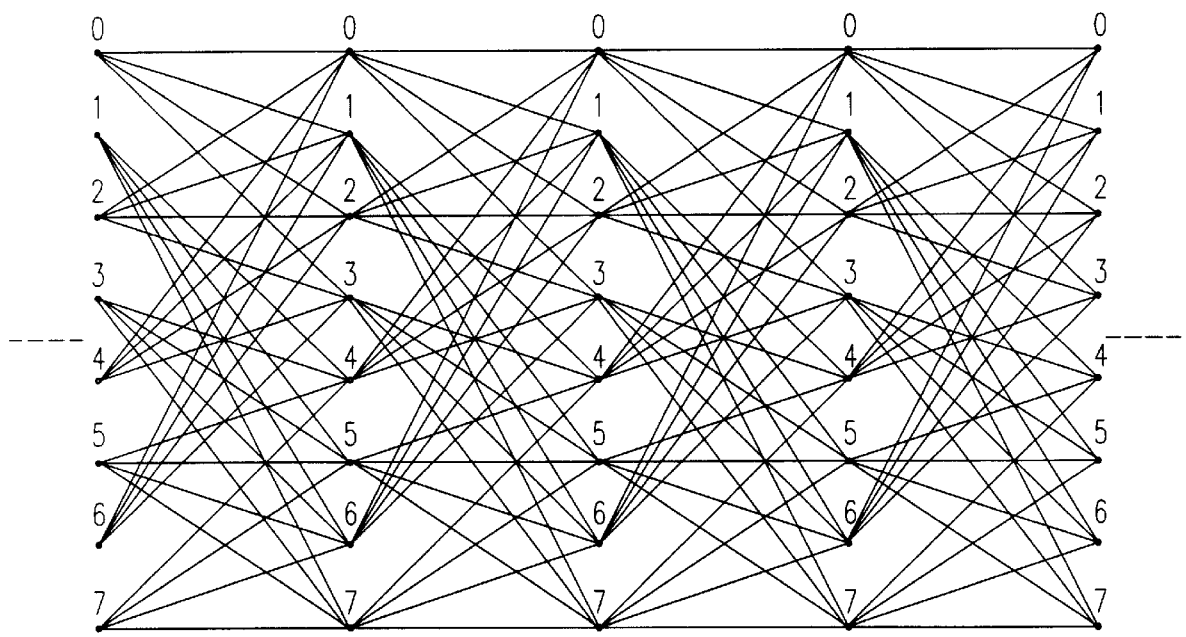
FIG. 5 shows a portion of the trellis corresponding to the trellis diagram of FIG. 4.

A sequence of concatenations of trellis diagrams associated with a particular trellis code comprises a trellis. For example, FIG. 5 shows a trellis corresponding to the trellis diagram of FIG. 4. In particular, FIG. 5 represents the possible successive state transitions of the trellis encoder. A sequence of signal points selected from any sequence of interconnected branches is a so-called path through the trellis.

Conventional Viterbi decoding of a trellis encoded signal uses the same subset partitioning and trellis diagram that was used in the transmitter. Decoding in arrangements embodying the principles of the invention may also use the same subset partitioning and trellis diagram that was used in the transmitter, as described in my co-pending U.S. patent application Ser. No. 09/023063 filed Feb. 2, 1998 and entitled "Path-Oriented Decoder for Signal-Dependent Noise." Such arrangements will provide a certain measure of conversion gain. However, the system of FIG. 1 illustratively follows the more sophisticated approach taught in my above-cited '268 co-pending application. In that approach, the received trellis encoded signal points are decoded, using a refined receiver trellis diagram, as though they had been divided in the transmitter into finer coding subsets—referred to as the receiver subsets—than they actually were. Use of a refined receiver trellis, instead of the prior art approach, provides for better estimates of what signal point was actually transmitted and, in combination with the path-oriented approach described in detail hereinbelow, provides for the realization of an even greater level of conversion gain. The manner in which conversion gain is achieved can be seen in reference to FIGS. 6, 7 and 8.

Figure 6:
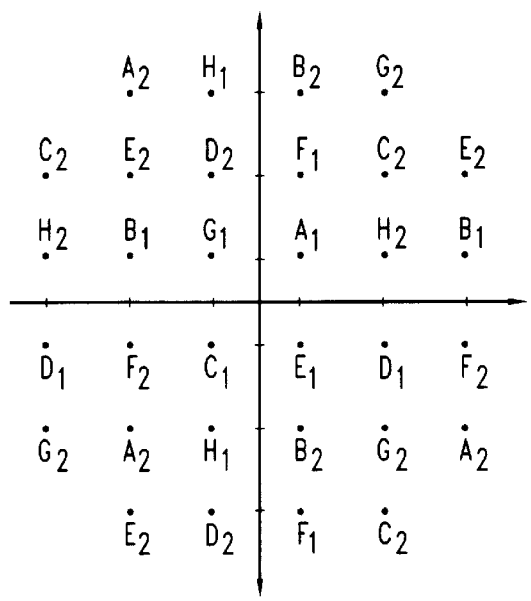
FIG. 6 shows the constellation of FIG. 3 in which each of the eight transmitter subsets is further partitioned into two receiver subsets.

As shown in FIG. 6, each of the eight transmitter subsets A through H of FIG. 3 is further partitioned into, illustratively, two receiver subsets, A$_1$ and A$_2$, B$_1$ and B$_2$, etc. The partitioning is carried out in such a way that the minimum distance between the signal points in any receiver subset is greater than the minimum distance between the signal points of any transmitter subset. It is not required to have the same number of signal points in each receiver subset. Thus, for example, receiver subsets A1 and A2 have one and three signal points, respectively. On the other hand, receiver subsets B1 and B2 each have two signal points. The number of receiver subsets into which the transmitter subsets are partitioned can, if desired, be adapted to channel conditions.

Figure 7:
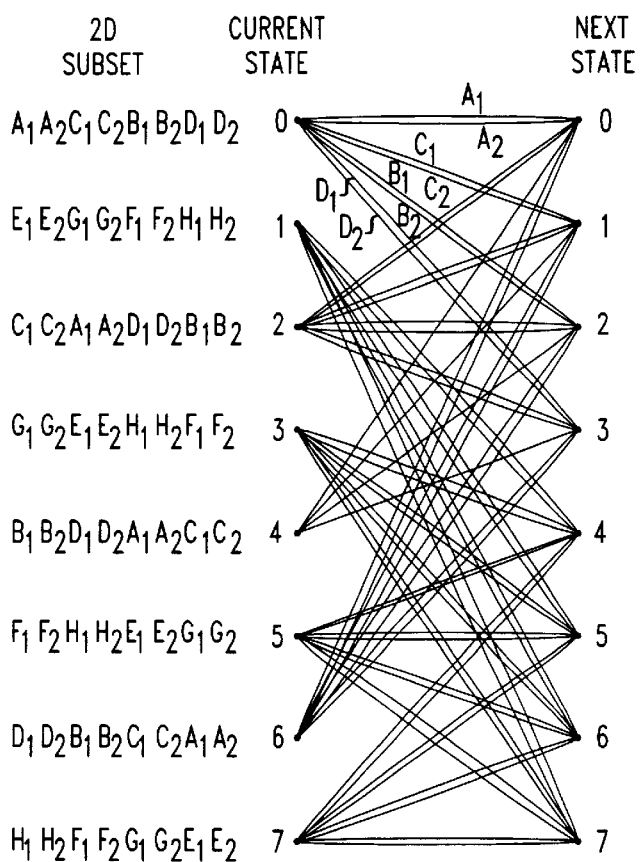
FIG. 7 shows a refined receiver trellis diagram based on the sixteen-subset partition of FIG. 6.

The aforementioned refined receiver trellis diagram is shown in FIG. 7. The refined, receiver trellis diagram has state transitions corresponding to state transitions of the transmitter trellis diagram and is the same as the transmitter trellis diagram of FIG. 4, except that it has two branches for each state transition, each branch being associated with one of the finer receiver subsets which is a part of the transmitter subset associated with the state transition. Thus, for example, the state transition in FIG. 4 associated with subset C connecting current state 0 to next state 1 is replaced in the trellis diagram of FIG. 7 by two parallel branches associated with receiver subsets C, and C$_2$, respectively.

Figure 8:
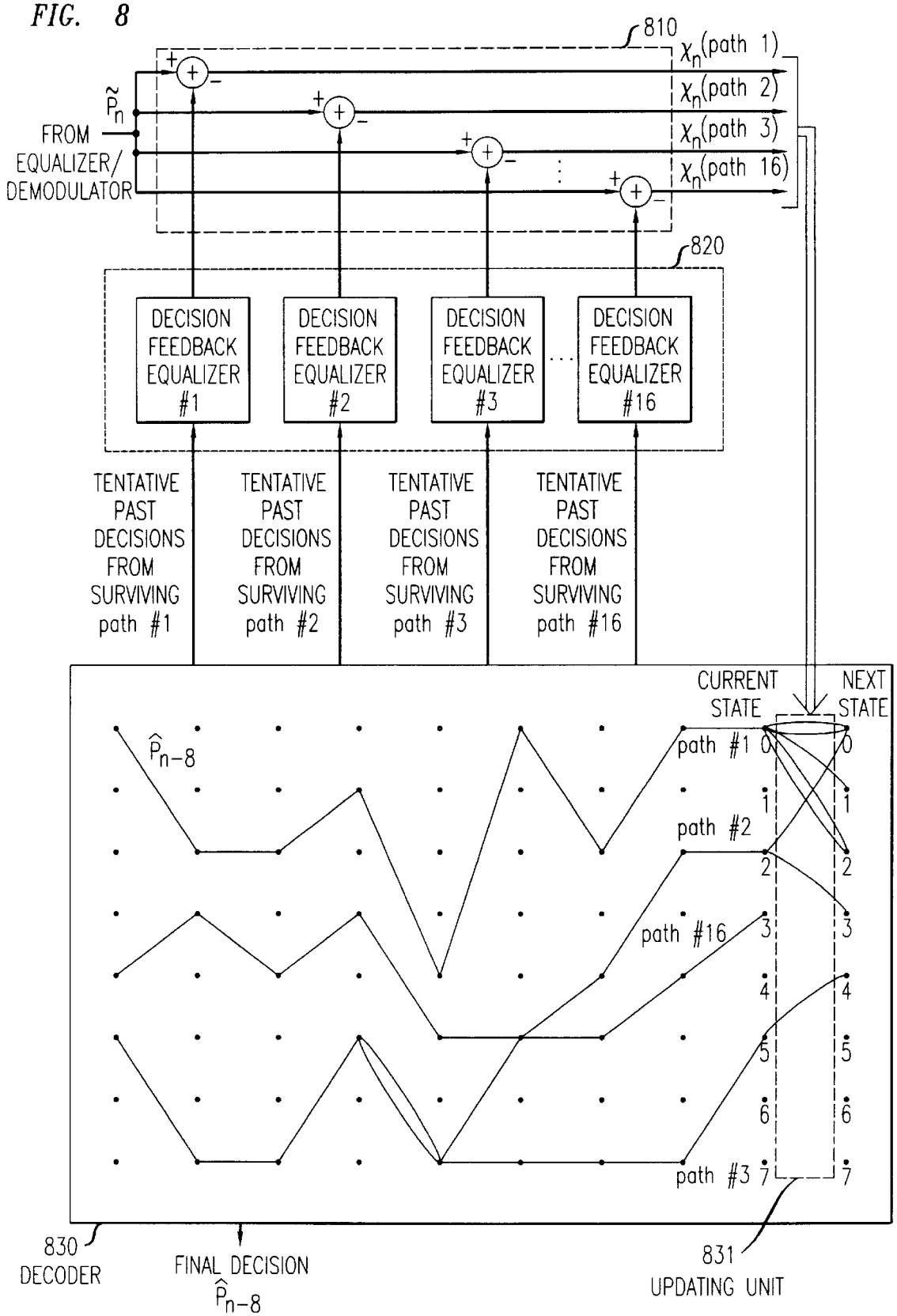
FIG. 8 provides a functional view, at a particular point in time, of the M-path joint decoder/DFE (decision feedback equalizer) used in the communication system of FIG. 1.

As noted earlier, joint DFE/decoder 202 in receiver 200 subjects a received signal point $\tilde{P}_n$ to decision feedback equalization prior to performing its decoding. FIG. 8 shows this in some detail.

In particular, FIG. 8 shows a M-path joint DFE/decoder in which M=16 replicas of $\tilde{P}_n$ are formed. A respective estimated intersymbol interference, or ISI, component is subtracted from each replica by a respective one of adders 810, to produce equalized signals $x_n^{(path\ 1)}$ through $x_n^{(path\ 16)}$. The ISI components are provided by respective ones of decision feedback equalizers 820, as described below.

The representation of decoder 830 in FIG. 8 shows four of sixteen so-called surviving paths #1 through #16 extending through the trellis, the four paths shown being paths #1, #2, #3 and #16. For drawing simplicity, the other twelve surviving paths are not shown. The signal points along each path constitute a sequence of tentative signal point decisions. A metric is maintained for each surviving path and, as described below, the current equalized signals $x_n^{(path\ 1)}$ through $x_n^{(path\ 16)}$ are used to determine new surviving paths having updated path metrics. A final decision $\hat{P}_{n-D}$ is thereupon made as to the value of one of the received signal points—specifically one that was received D signaling intervals earlier. The so-called decoding depth D of "8" is used herein for purposes of illustration. Thus, a final decision $\hat{P}_{n-8}$ is made as to the value of the signal point received 8 signaling intervals earlier. In actual practice, the decoding depth depends on the code that is being used and will typically be greater than 8. Typically, the path having the smallest metric at this time—called the very best surviving path—is identified. The signal point on that path 8 signaling intervals earlier is taken as the final signal point decision.

Each of the DFEs 820 is associated with a particular one of the surviving paths #1 through #16. In particular, each DFE generates its aforementioned respective estimated ISI component, or ISI estimate, as a function of the tentative signal point decisions which lie along the associated surviving path. At this time, the ensemble of tentative signal point decisions along each surviving path is applied to the associated DFE in preparation for the generation of ISI estimates to be applied to adders 810. In particular, as is well known, a DFE forms its ISI estimate by forming a combination (illustratively a linear combination) of the decisions that have been input to it using an ensemble of coefficients whose values typically are adaptively updated. Thus, each of the equalized signals $x_n^{(path\ 1)}$ through $x_n^{(path\ 16)}$ is associated with a particular surviving path in that the ISI estimate that was used to form that equalized signal was generated as a function of the associated surviving path.

The process by which, as mentioned above, the current equalized signals $x_n^{(path\ 1)}$ through $x_n^{(path\ 16)}$ are used to determine new surviving paths having updated path metrics is carried out by updating unit 831 within decoder 830. So-called branch metrics are calculated for each of the current-to-next state 128 branches emanating from the M=16 surviving paths in accordance with the receiver trellis diagram of FIG. 7 (for simplicity, only several such branches are shown in FIG. 8). The branch metric for each branch is given by the squared Euclidean distance between one of the equalized signals $x_n^{(path\ 1)}$ through $x_n^{(path\ 16)}$ and the closest signal point in the receiver subset associated with that branch. The particular one of the equalized signals $x_n^{(path\ 1)}$ through $x_n^{(path\ 16)}$ that is used to calculate any given one of the branch metrics is the equalized signal associated with the surviving path from which that branch emanates. At this point, there are 128 candidate paths, eight leading from each of the sixteen surviving paths. Each candidate path has an associated metric given by the sum of the current path metric of the corresponding surviving path and the branch metric of the corresponding branch.

In the conventional, state-oriented approach used in Viterbi decoders, only one path entering a state can be declared a surviving path. However, joint DFE/decoder 202 utilizes the "path-oriented" approach as taught in my aforementioned co-pending '268 and '063 patent applications. That is, the paths which are retained as surviving paths are those M candidate paths having the smallest updated path metrics, even if that means that two candidate paths leading into the same next coder state are retained. As noted above, the ISI estimate generated by each DFE is a function of a respective surviving path through the trellis. As a result, each of the ISI-compensated signals $x_n^{(path\ 1)}$ through $x_n^{(path\ 16)}$ is also a function of some surviving path. The branch metrics, in turn, are a function of the ISI-compensated signals. Ultimately then, the branch metric for branches which extend from any given path are themselves a function of the path itself. Thus, the path that has the smallest metric at a particular point in time may ultimately not have the smallest path metric once extended because the branch metrics for each branch—even though extending from the same state—are path-dependent and therefore different.

As mentioned earlier, the decoding process arrives at a final decision $\hat{P}_{n-D}$ as to the value of a signal point transmitted D signaling intervals earlier. By providing that the ISI components be functions of the surviving paths, the dispersed signal energy of the earlier received signal point is returned to that signal point. As a result, conversion gain is realized and more accurate decoding is achieved.

The decoding process described above is well suited for applications in a so-called continuous transmission environment in which a very large number of signal points are transmitted. In such applications, except for the last few received signal points, there are signal points subsequent to the earlier received signal points from which the signal energies of the earlier received signal points can be gathered so as to realize the conversion gain offered by the decoding process. Moreover, a number of dummy signal points may be transmitted following the transmission of the data signal points so as to enable the gathering of the ISI components of the ending useful data signal points—and hence provide conversion gain relative to them—with relatively insignificant overhead, given the large number of useful data signal points transmitted.

The decoding process described above may also be employed in a packet transmission environment in which signal points are transmitted in successive disjoint packets or communications, each of which contain a relatively small number of signal points (typically on the order of several hundreds). However, in a packet transmission environment, the advantages of this decoding process are not fully realized. In particular, there is a smaller number of subsequent signaling intervals from which the dispersed ISI energy from a transmitted signal point can be gathered and returned to the respective signaling intervals in which the last few signal points in a packet were transmitted. Moreover, the transmission of dummy signal points following the data signal points would lower bandwidth efficiency (average number of useful data bits per signaling interval) to a quite disadvantageous extent given the relatively small number of signal points contained in a packet. As a result, conversion gain is not realized for at least these "ending" signal points and the decoding reliability of the ending signal points is therefore less reliable than that of the signal points for which conversion gain was secured. Disadvantageously, the unreliability of the ending signal points relative to the other signal points would dominate the overall performance because, in some applications, even if only one signal point in a packet is in error, an entire packet is flagged as being in error and must be re-transmitted.

The above problem is overcome in accordance with the principles of the present invention by causing signal points appearing at predetermined positions in a signal point stream that benefit less from a particular form of error immunity enhancement to be transmitted in such a way that their robustness against errors is at least as great as that of the signal points that benefit more from that particular form of error immunity enhancement. That is, the probability of erroneously decoding the single points that benefit less from the particular form of error immunity enhancement is substantially no less than the probability of erroneously decoding the other signal points. Thus the invention eliminates the above-described problem of the ending signal points dominating the overall error rate performance of, for example, a packet transmission signaling scheme.

In the disclosed illustrative packet transmission embodiments of the invention, the ending signal points of a packet are transmitted using a signal point constellation that has fewer signal points than is used for those which precede them so that the ending signal points can be further apart from one another in signal space. As a result, more noise may be tolerated and the overall error performance of the ending signal points can be made no worse than that of the other signal points. Thus, essentially the same overall packet error rate as that which is achieved for continuous transmission can be achieved for packet transmission because (a) the signal points that occur earlier in the packet benefit from conversion gain and (b) another form of enhanced error immunity is provided for the ending signal points which do not benefit from conversion gain. Furthermore, the invention significantly ameliorates the reduction in bandwidth efficiency that would be occasioned by the use of dummy signal points as described above.

Figure 9:
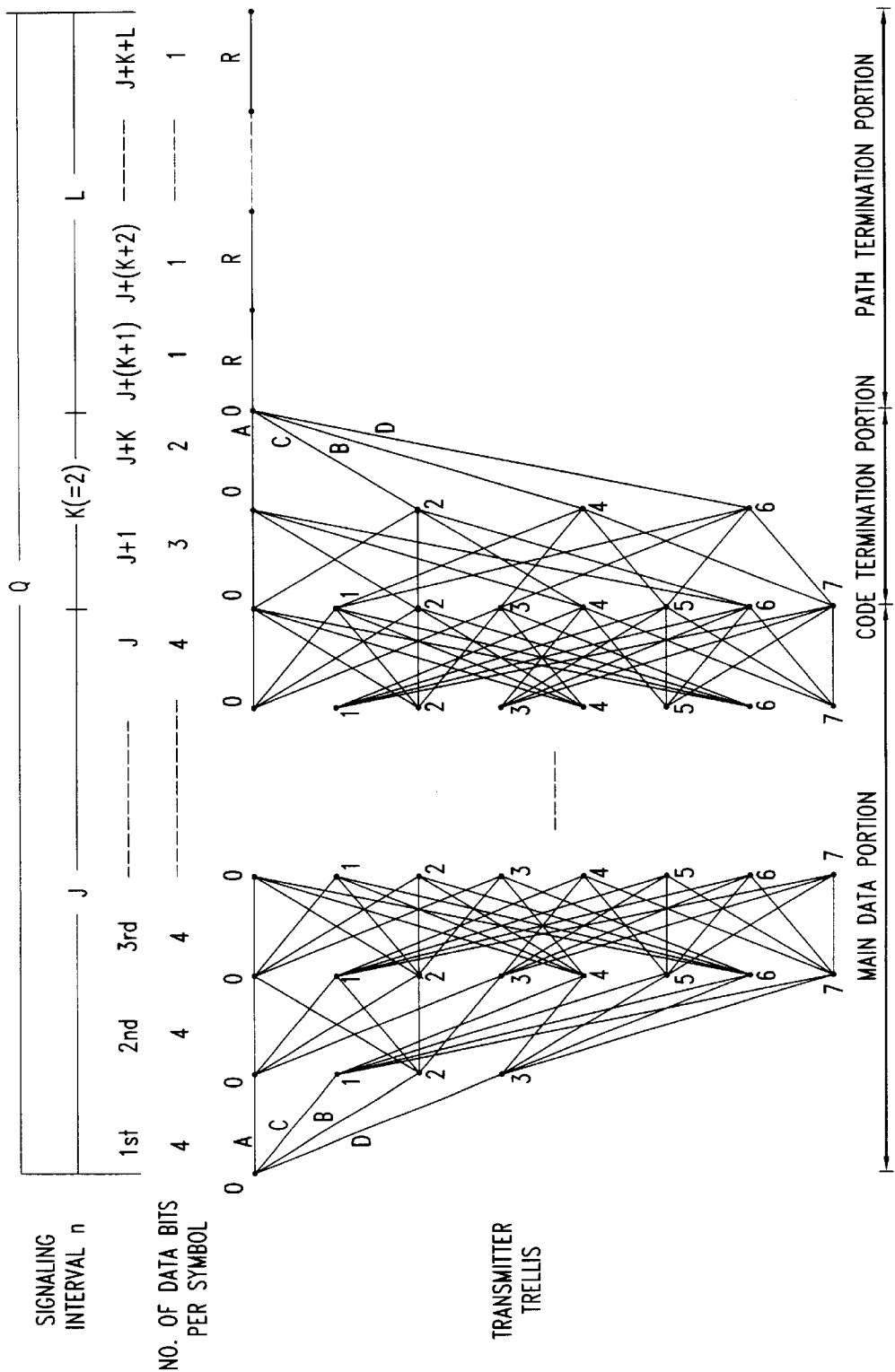
FIG. 9 shows the main-data, code-termination and path-termination portions of a transmitter trellis for a coded modulation system in a packet transmission environment pursuant to the principles of the invention.

Thus in the illustrative embodiment, transmitter 101 generates a packet of $Q=(J+K+L)$ signal points over Q signaling intervals, as illustrated by the transmitter trellis of FIG. 9. In particular, the successive state transitions of trellis encoder 106 from a "starting state" to a "terminating state" are represented for the first J+K signaling intervals, the state of encoder 106 being defined, as mentioned above, by the bit values stored in its three T-second delay elements—referred to as state variables $W1_n$, $W2_n$ and $W3_n$. In FIG. 9, the encoder starting state is illustratively the zero state (i.e., the initial values of the state variables are zero). For every one of the first J signaling intervals, four data bits are provided as shown in FIG. 2 to trellis encoder 106 and processed in the manner described above.

In systems utilizing the invention where there is no trellis coding, it is a straightforward matter to implement the above-mentioned transmission of the ending signal points using a smaller signal point constellation than is used for those signal points which precede them, pursuant to the principles of the invention. In this embodiment, however, there is coding. Accordingly, in order for the coded signal points to be accurately decoded without the requirement of the transmission of enough dummy signal points to cover the decoding depth, the trellis code should be brought to a known state, or terminated in known fashion. The invention is thereafter applied to signaling points subsequent to those used in termination.

More particularly, code-termination is typically achieved by providing certain input bits that are appended to, or co-mingled with, the last few data bits that are input to the encoder in such a manner as to cause the encoder to terminate in a predetermined state known to the receiver. (Knowledge of the terminating encoder state allows the receiver to immediately determine the very best surviving path—along which decisions as to signal points are made—because surviving paths that do not terminate in that state can be eliminated from consideration. Hence, the signal point decisions can be made immediately by tracing back along that very best surviving path.) As can be seen from FIG. 9, the encoder has transitioned from its starting state into its terminating state, illustratively the zero state, at the end of the $(J+K)^{th}$ signalin interval. (The starting and terminating states need not be the zero state and, in fact, need not be the identical state. The starting and terminating states must, however, be known to the decoder.) The bringing of the encoder to its terminating state—that is, terminating the code—is achieved over K signaling intervals, K illustratively being equal to 2. This is carried out by (a) providing, for the $(J+1)^{st}$ signaling interval, only three data bits, $I2_n$ through $I4_n$, to trellis encoder 106, $I1_n$ being set equal to the value of $W2_n$, and (b) for the subsequent $(J+K)^{th}$ signaling interval—the $(J+2)^{nd}$ signaling interval— providing only two data bits, $I3_n$ and $I4_n$, to trellis encoder 106, $I1_n$ and $I2_n$ being set equal to the value of $W2_n$ and $W1_n$, respectively.

For each of the first (J+K) signaling intervals, five encoder output bits, $Y0_n$–$Y4_n$, are provided to constellation mapper 108 which utilizes them, as discussed above, to determine which signal point of the illustrative constellation of FIG. 3 should be transmitted as signal point $P_n$. The signal points generated over the first J signaling intervals are referred to herein as the main-data signal points. The signal points generated over the next K=2 subsequent signaling intervals as part of the code-terminating process are referred to herein as the code-terminating signal points.

Figure 11:
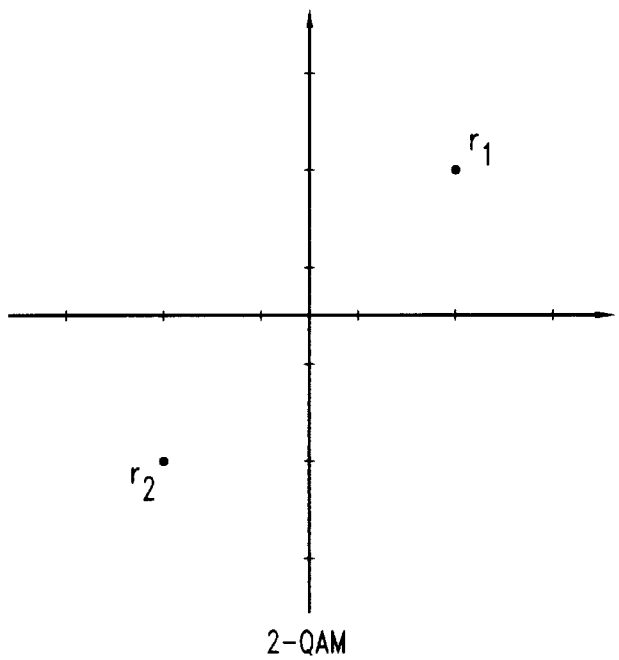
FIG. 11 shows an illustrative 2-QAM signal point constellation on which the path-termination portion of FIG. 9 is based.

The data bits in the subsequent L signaling intervals are processed pursuant to the principles of the present invention. In particular, in the present illustrative embodiment, the signal points transmitted in those signaling intervals, which benefit less from conversion gain, are transmitted in such a way that their robustness against errors is at least as great as that of the (J+K) prior signal points that benefit more therefrom. More particularly, these signal points, referred to herein as the path-terminating signal points, are illustratively selected from a constellation which is smaller, i.e., has fewer signal points, than that used for the prior signaling intervals. This smaller constellation is illustratively the 2-QAM constellation of FIG. 11. In preferred embodiments, this predetermined smaller constellation follows certain design rules discussed in detail below. The constellation of FIG. 11 is comprised of two signal points, $r_1$ and $r_2$, comprising a single transmitter subset, R.

Figure 12:
FIG. 12 shows an illustrative transmitter trellis diagram for path-termination corresponding to the transmitter trellis of FIG. 9.

For each of the $(J+K+1)^{st}$ to $Q^{th}$ signaling intervals, one data bit is used by constellation mapper 108 to select one of the two signal points. The encoder remains in the terminating state and the corresponding transmitter trellis diagram, as shown in FIG. 12, comprises a single node for each signaling interval with a single branch connecting the single current state to the single next state. This branch is labeled R, indicating that each signal point to be transmitted is a member of the subset R. Thus as shown in FIG. 9, the trellis extending from the $(J+K+1)^{st}$ through the Q signaling intervals is a concatenation of the single-branched trellis diagram of FIG. 12. Each of the path-terminating signal points is thus selected from the one subset R.

To summarize, then, a packet of Q signal points is transmitted. The packet includes main-data signal points, code-terminating signal points and path-terminating signal points, all of which are data-bearing. (For uncoded applications, as will be described in more detail hereinbelow, there is no need for code-terminating signal points and hence the path-terminating signal points immediately follow the main-data signal points.) A noise- and ISI-corrupted version of the signal points is received by receiver 200 and, in particular, by M-path joint DFE/decoder 202 which operates to recover the transmitted signal points.

Figure 10:
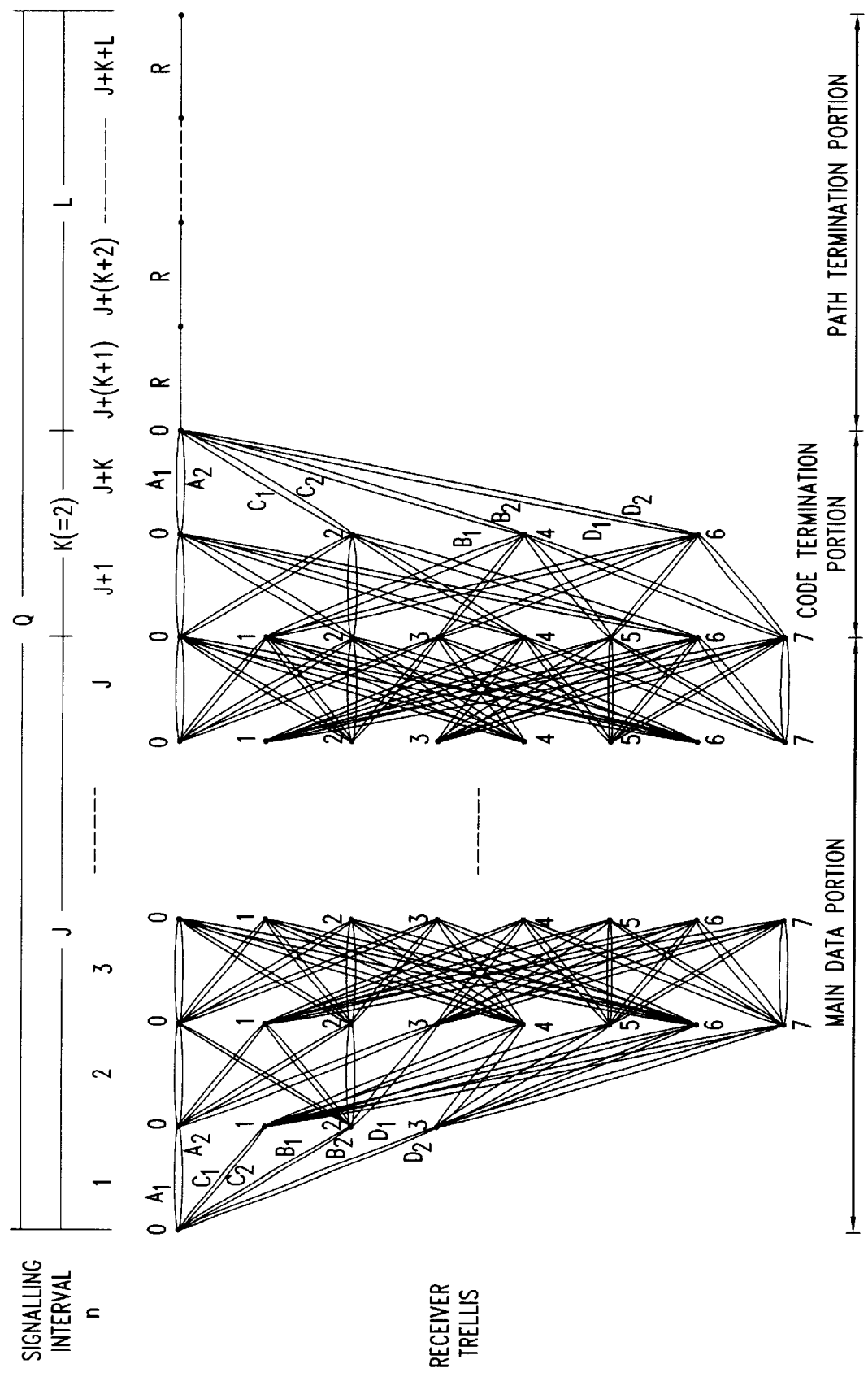
FIG. 10 shows the main-data, code-termination and path-termination portions of a receiver trellis for a coded modulation system in a packet transmission environment pursuant to the principles of the invention.

FIG. 10 shows the receiver trellis used in the decoding of the transmitted packet of signal points. As can be seen, for the path-terminating signal points, the receiver trellis corresponds to the transmitter trellis in that there is only one state and only one branch from the current to next state. For the main-data and code-terminating signal points, the receiver trellis is illustratively comprised of a sequence of concatenations of the refined receiver trellis diagram of FIG. 7. That is, for these signal points, although the transmitter trellis is based on an 8-subset partition of the constellation, the receiver trellis used by the joint DFE/decoder is based on an 16-subset partition.

As described earlier, responsive to the received main-data and code-terminating signal points, successive sets of M surviving signal point paths through the refined receiver trellis are identified such that more than one path corresponding to an individual sequence of transmitter signal points can be identified as ones of the surviving paths. The M surviving paths that terminate at the code-terminating state (e.g., state 0) during the $(J+K)^{th}$ signaling interval are then extended in the same manner described as above—in which ISI components are made functions of the surviving paths—as the corrupted path-terminating signal points are received. The fact that there are path-terminating signal points ensures that all of the prior signaling points enjoy the full benefit of the conversion gain afforded by the path-oriented joint decoder/DFE.

The transmitted signal points are recovered in the conventional manner by tracing back along the very best surviving path through the receiver trellis. In particular, for a signaling interval (other than the $Q^{th}$ signaling interval) after the $D^{th}$ signal interval, where D is the decoding depth, the joint DFE/decoder provides a final decision as to a signal point received D signaling intervals earlier. During the $Q^{th}$ signaling interval, after the last signaling point is received, final decisions are made as to the signal points for which a decision has not yet been made by tracing back along the very best path of the M surviving paths terminating on the single state of that $Q^{th}$ signaling interval to the point where the making of decisions was left off. In some packet transmission applications, the making of any decision is postponed until the last signal point in the packet has been received. At that time, the signal points obtained by traceback along the very best path to the beginning of the packet are declared, all at one time, to be the transmitted signal points.

As noted earlier, in preferred embodiments, the smaller constellation used in the transmission of the path-terminating signal points follows certain design rules. First, the average power of this smaller constellation should not be greater that the average power of the larger constellation used in the transmission of the main-data and data-terminating signal points because the average power of the entire transmission would otherwise be increased. However, a violation of this rule will not, by itself, compromise the advantages of the invention.

Second, the minimum distance between the signal points of the smaller constellation should be no less than the minimum distance between the signal points of each receiver subset (e.g., A1, A2, B1, B2, etc.), i.e., the intra-subset minimum distance of the receiver subsets, of the larger constellation. If this latter requirement is not met, the accuracy of the decoding of the path-terminating signal points would be less reliable than that of the other signal points, thereby defeating one of the objectives achieved by the invention.

Any constellation that satisfies the above-described requirements may be utilized as the smaller constellation for the path-terminating signal points. The number of signal points comprising the smaller constellation is a function of many factors such as, for example, the channel condition and the size of the larger constellation used for the main-data and code-terminating signal points. As the size of this latter constellation increases, the size of the constellation that will be utilized as the smaller constellation may be increased as well. For example, if the larger constellation is a coded 64-QAM, the smaller constellation may be a 4-QAM constellation. Moreover, although the smaller constellation in the present embodiment could have been comprised of, for example, the signal points in one particular receiver subset such as $B_2$, doing so would have introduced a d.c. component which is generally undesirable. Although not necessary, it may be convenient from an implementational viewpoint, however, to choose as the signal points of the smaller constellation signal points selected from the larger constellation.

As noted above, the invention is applicable not only to arrangements implementing coded modulation (in which an N-state transmitter is utilized, N being greater than 1), but also to arrangements using uncoded modulation (in which N is one). In the latter arrangements, the transmitter trellis diagram has only N=1 state and only one state transition. FIGS. 13–16 exemplify this approach.

In one implementation of the present invention in an uncoded modulation system, transmitter 101 generates a packet of Q' signal points over Q' signaling intervals, the Q' signal points being comprised of J main-data signal points and L path-terminating signal points, i.e., Q'=(J+L). (Since this is an uncoded system, there is no need to have code-terminating signal points because there is no code that must be terminated.) in particular, the bits provided in parallel at the output of converter 104 are provided to constellation mapper 108, which in turn, uses these bits to select a channel signal point (there is no trellis encoder in an uncoded modulation system).

Figure 13:
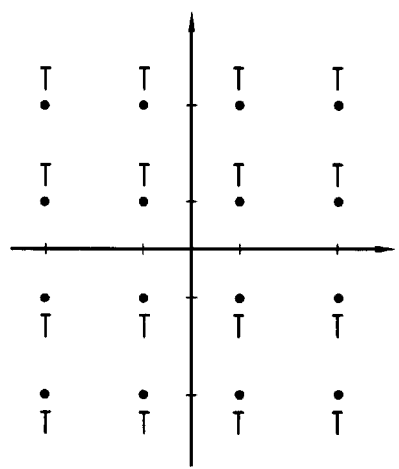
FIG. 13 shows a sixteen-signal-point constellation.

More specifically, for every one of the J main-data signal points, four of the converter output bits are used by constellation mapper 108 to select as a main-data signal point a signal point from a predetermined constellation of signal points, illustratively from the 16-QAM constellation of FIG. 13. Since the system is uncoded, there are no constellation subsets in the trellis coding sense. However, all 16 signal points of the constellation can be thought of as comprising a single subset, T.

For every one of the L path-terminating signal points, one converter output bit is used by constellation mapper 108 to select as a path-terminating signal point a signal point from a second predetermined constellation of signal points, illustratively from the 2-QAM constellation of FIG. 14. In preferred embodiments, this second predetermined constellation of signal points follows the above-described design rules. The constellation of FIG. 14 is comprised of two signal points, $s_1$ and $s_2$, comprising a single transmitter subset, S.

Figure 15:
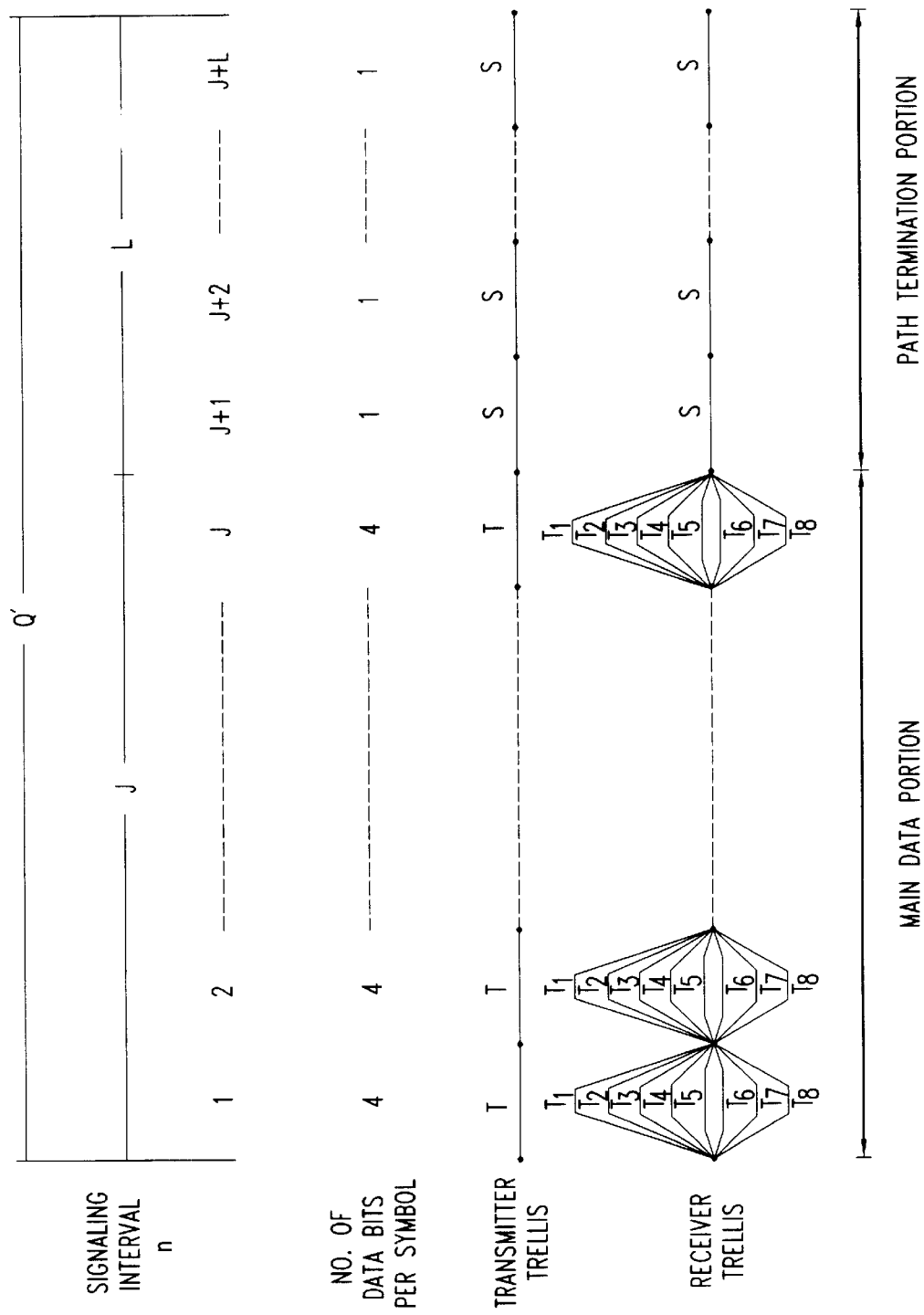
FIG. 15 shows the respective main-data and path-termination portions of a transmitter trellis and a receiver trellis for uncoded modulation in a packet transmission environment pursuant to the principles of the invention.

The operation of transmitter 101 is illustrated in the transmitter trellis of FIG. 15. Since it is possible to transmit any of the signal points selected from the 16-QAM constellation during the first J signaling intervals and either one of the signal points selected from the 2-QAM constellation during the subsequent L signaling intervals, the transmitter has only one state and thus the trellis is comprised of a sequence of single branches. The one branch connecting the single current state to the single next state is labeled T for the first J signaling intervals during which the main-data signal points are generated, indicating that the next signal point to be transmitted for these signaling intervals is a member of subset T. Similarly, the branch connecting the single current state to the single next state is labeled S for the subsequent L signaling intervals, indicating that the next signal point to be transmitted for these signaling intervals is a member of subset S.

In the receiver, the single transmitter subset T is illustratively partitioned into 8 refined receiver subsets $T_1$ through $T_8$, as shown in FIG. 16. The refined receiver trellis of FIG. 15 reflects this partitioning in that each of the single branches for the first J signaling intervals are replaced by 8 branches, each corresponding to one of the 8 receiver subsets. The portion of the trellis used for decoding the final L, path-terminating, signal points remains the same as the corresponding portion in the transmitter trellis. That is, for these signaling intervals, there is only one branch between the current and next state and that branch is associated with the entire 2-QAM constellation. Decoding proceeds in the same manner as described above for the coded case.

Figure 17:
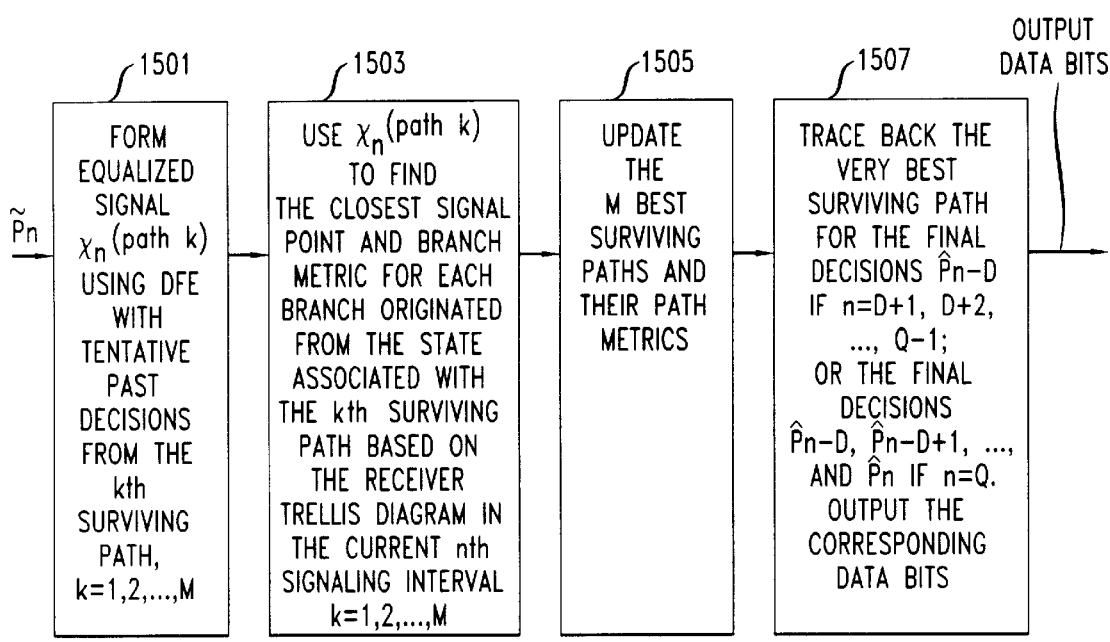
FIG. 17 is a combined block diagram/functional description view of the M-path joint DFE/decoder of FIG. 1.

FIG. 17 provides a combined block diagram/functional description view of the M-path joint DFE/decoder 202 in the above-described trellis-coded packet transmission environment. Received signal point $\tilde{P}_n$ is processed at block 1501 to produce an equalized signal associated with each of the M surviving paths. That is, an equalized signal $x_n^{(path\ k)}$ is formed using a DFE whose inputs are the tentative past decisions along the $k^{th}$ surviving path, k being 1, 2, 3, ..., M.

At block 1503, equalized signal $x_n^{(path\ k)}$ is used to find: a) the closest signal point in the receiver subset associated with each branch, and b) the branch metric for each branch emanating from the state associated with the $k^{th}$ surviving path based on the receiver trellis (such as the exemplary receiver trellises of FIG. 10 and FIG. 15) in the current $n^{th}$ signaling interval. Then, at block 1505, the M best surviving paths and their path metrics are updated, and a new set of M best surviving paths are identified. The one of the new set of M best surviving paths with the best path metric (e.g., the surviving path having the smallest path metric) is identified as the very best surviving path. At block 1507, by tracing back along the very best surviving path, for the current signaling interval n, data corresponding to (a) the final decision $\hat{P}_{n-D}$ as to the value of a signal point transmitted D signal points earlier, where n=(D+1), (D+2), ..., (Q-I); or (b) the final decisions $\hat{P}_{n-D}, \hat{P}_{n-D+1}, ..., \hat{P}_n$, where n=Q, is found by tracing back along the very best surviving path. (A combined block diagram/functional description view of the M-path joint DFE/decoder 202 for the above-described uncoded packet transmission environment would be the same as FIG. 17, but replacing Q with Q'.)

An appropriate number, L, of path-terminating signal points to be included in a packet is dependent on the particular ISI channel. The more severe the ISI, the greater the value that L should take on because the energy of a given signal point will be spread over an increasingly large number of adjacent signaling intervals. Thus, to determine the value of L, the transmitter may be provided with, or may be able to obtain from the receiver, information such as the length of the channel. Or, the transmitter may make a worst-case estimate of the channel information.

Figure 18:
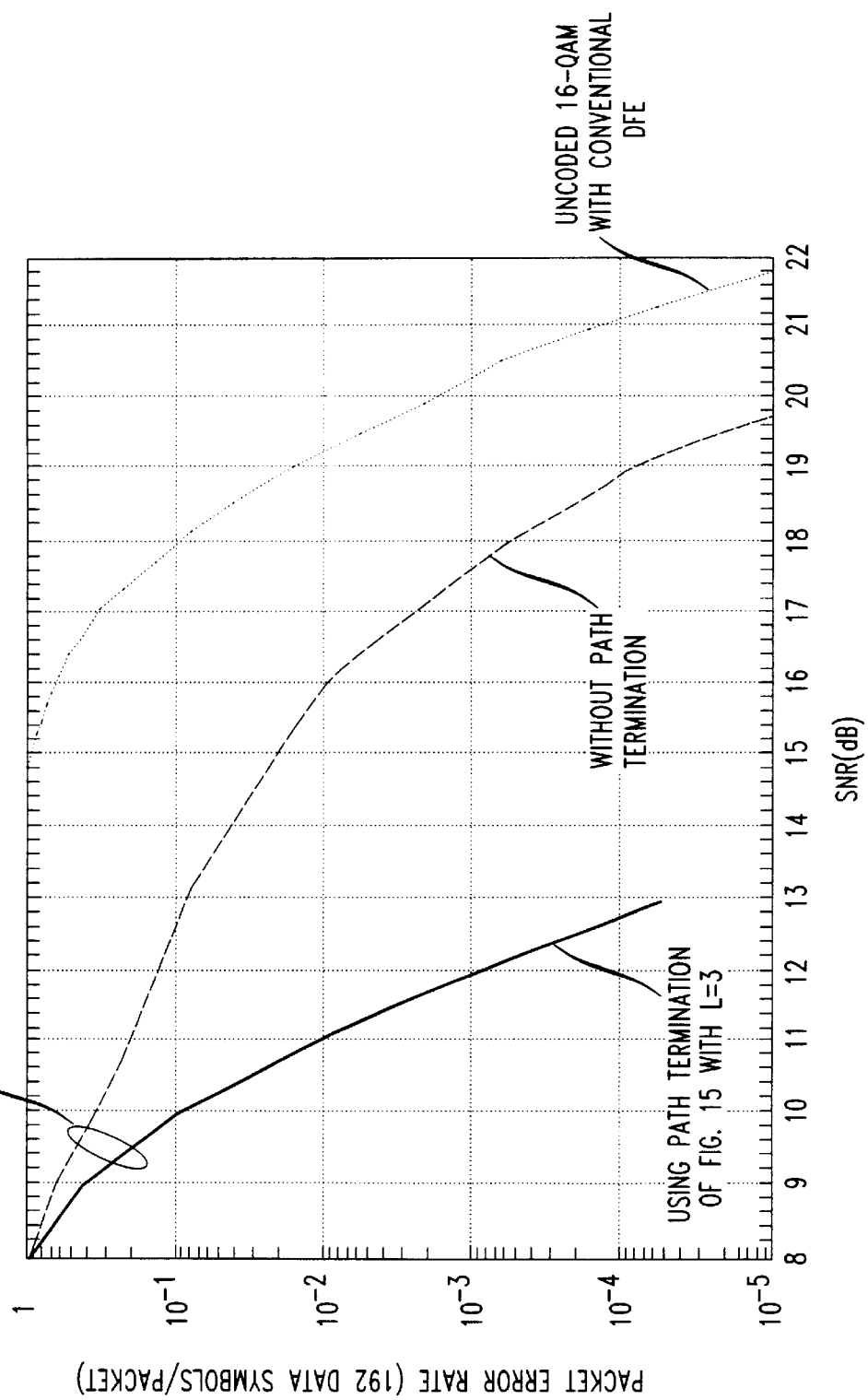
FIG. 18 shows the performance over a particular ISI channel of an uncoded 16-QAM of FIG. 13 with a 12-path joint DFE/decoder of FIG. 1 based on the partition of FIG. 16 with and without path-termination.
Figure 19:
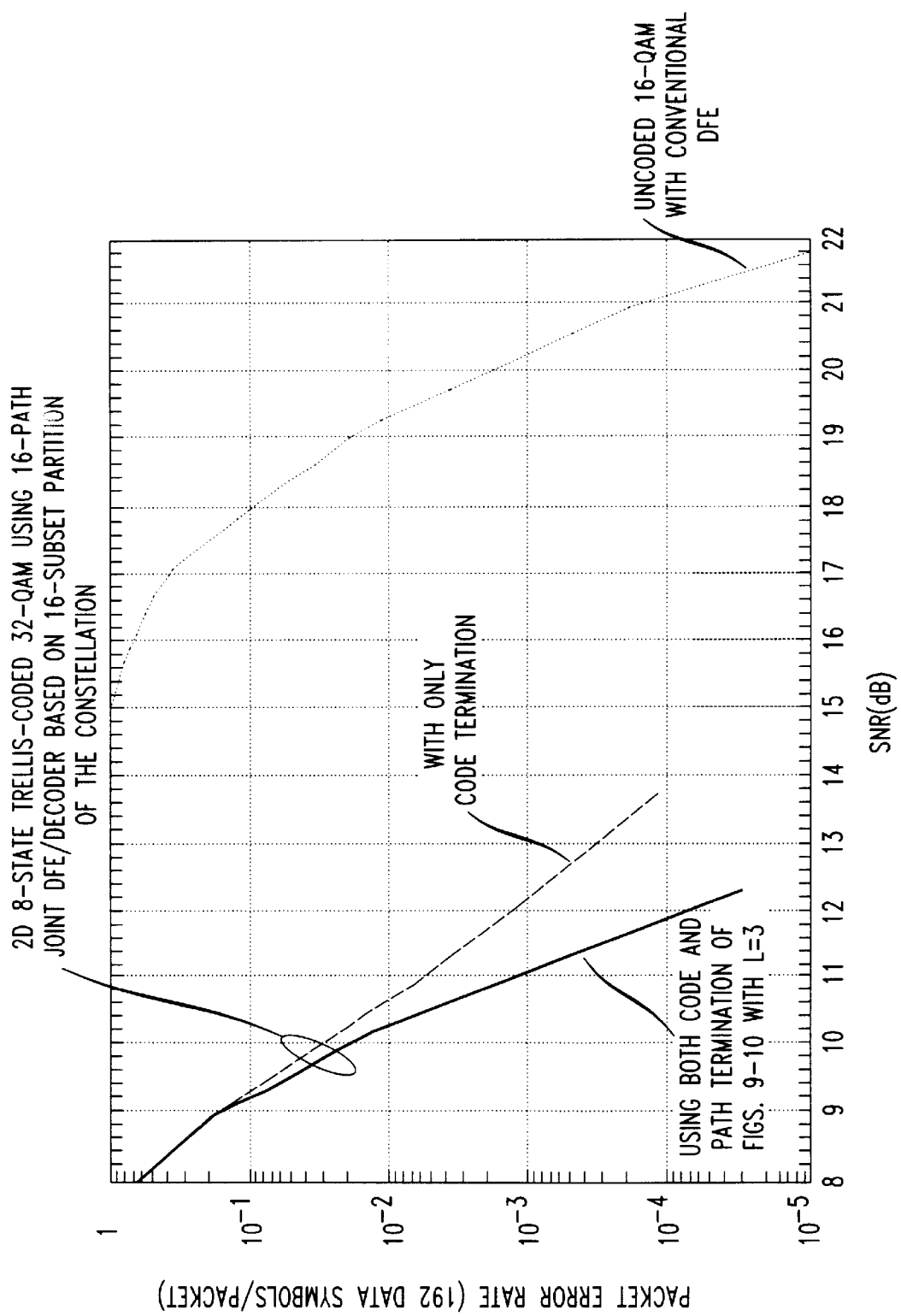
FIG. 19 shows the performance over a particular ISI channel of a coded 32-QAM of FIGS. 2–3 with a 16-path joint DFE/decoder of FIG. 1 based on the partition of FIG. 6 with and without path-termination.

Error rate curves shown in FIGS. 18 and 19 illustrate the advantageous nature of the present invention. Each of those FIGS. shows, for a particular channel, curves depicting the experimentally determined packet error rate as a function of the channel signal-to-noise ratio, each curve being for a respective decoding approach, as indicated. Each successive curve, moving from right to left, represents an improved level of performance in that higher level of channel noise, i.e., a lower signal-to-noise ratio, can be tolerated while still achieving a given packet error rate. (The signal-to-noise ratio shown on the x-axis in these FIGS. refers to the ratio between the signal power and the additive Gaussian noise power, without including the ISI component. The curves themselves do, however, take ISI into account.)

FIG. 18 compares three different decoding approaches for an uncoded 16-QAM, each with increasing performance over the previous approaches: (1) using the conventional DFE; (2) using a joint 12-path DFE/decoder based on a refined eight-subset partition of the 16-QAM constellation but without path-termination; and (3) using the approach of (2) but employing path-termination pursuant to the invention with L=3. The performance achieved by any particular approach, as compared to another, can be expressed in terms of the processing gain, meaning the difference in signal-to-noise ratio between their performance curves at a given packet error rate. It can easily be seen from FIG. 18 that, for example, at a packet error rate of $10^{-4}$, most of the processing gain achieved by use of the M-path joint DFE/decoder is lost if path termination is not performed. This is because the path-termination approach pursuant to the principles of the invention provides for the final decisions for the main data signal points in a packet to take advantage of the conversion gain and for the path-terminating signal points themselves to have enhanced error immunity.

FIG. 19 shows the results for a coded modulation system. In particular, the FIG. shows the benchmark curve for an uncoded 16-QAM with the conventional DFE. Significantly better performance is achieved using two-dimensional 8-state trellis-coded 32-QAM with an 16-path joint DFE/decoder based on a refined 16-subset partition of the constellation, with only code-termination being employed. Even better performance is achieved using that same code and joint DFE/decoder but now employing both code and path-termination pursuant to the principles of the invention, with L=3.

The foregoing merely illustrates the principles of the invention. For example, in arrangements embodying the principles of the invention, whether using coded or uncoded modulation, it is possible, if desired, to include another "layer" of coding, such as Reed-Solomon coding. Such coding would be applied to the data bits desired to be communicated ahead of the modulation. Thus in FIG. 1, for example, a Reed-Solomon or other coder could be interposed between scrambler 102 and S/P converter 104 and a Reed-Solomon decoder would be interposed between P/S converter 204 and descrambler 206. Conventional interleaving and de-interleaving can also be employed, as is often the case when Reed-Solomon coding is involved.

Channel 112 of the illustrative embodiment is illustratively a wired or wireless telecommunications channel extending over a significant physical distance. However, the invention is equally applicable to other transmission paths referred to as "channels," including, for example, audio and/or video magnetic, or other, recording media. In such arrangements, as in telecommunications applications, that part of the system which applies the signal points to the channel is the "transmitter" and that part of the system which receives the signal points from the channel is the "receiver."

The block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

All examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Similarly, in the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner called for in the claims. Applicants thus regard any means which can provide those functionalities as equivalent to those shown herein.

It will thus be appreciated that those skilled in the art will be able to devise various arrangements which, although not explicitly shown or described herein, embody the principles of the invention and thus are within its spirit and scope.

I claim:

1. A method comprising steps of
    transmitting a first portion of a stream of signal points to a receiver, the receiver being such that the first portion signal points benefit from a particular form of error immunity enhancement to achieve a level of error immunity, the error immunity enhancement being distinct from any transmitter coding, and
    transmitting a second portion of said stream of signal points to said receiver, said second portion signal points occurring at predetermined positions within said stream of signal points, the receiver being such that said second portion signal points benefit from said particular form of error immunity enhancement to a lesser extent than said first portion signal points, said second portion signal points being such that they nonetheless achieve substantially said level of error immunity.

2. The invention of claim 1 wherein said second portion signal points occur in said stream after said first portion signal points.

3. The invention of claim 1 wherein said first portion signal points are selected from a first signal point constellation and said second portion signal points are selected from a second signal point constellation that has fewer signal points than said first signal point constellation.

4. The invention of claim 3 wherein said first signal point constellation is partitioned into a plurality of receiver subsets of signal points, wherein the receiver processes said first portion signal points in a way that takes account of that partitioning, and wherein said second constellation is comprised of a plurality of signal points separated by a minimum distance, said minimum distance being no less than an intra-subset minimum distance of said subsets.

5. The invention of claim 4 wherein said receiver decodes at least said first portion signal points using a path-oriented joint decoder/DFE.

6. The invention of claim 4 wherein said particular form of error immunity enhancement is conversion gain.

7. A method of decoding a stream of transmitted signal points, said stream being comprised of first signal points and second signal points, said method comprising the steps of
    forming decisions as to said first transmitted signal points in such a way as to provide them with conversion gain, and
    forming decisions as to said second transmitted signal points in such a way as to provide them with less conversion gain, said second transmitted signal points having been generated in such a way that the probability of erroneously decoding them is substantially no greater than the probability of erroneously decoding said first portion transmitted signal points.

8. The invention of claim 7 wherein said second transmitted signal points occur at predetermined positions within said stream.

9. The invention of claim 8 wherein said second transmitted signal points occur in said stream after said first transmitted signal points.

10. The invention of claim 9 wherein said first transmitted signal points are selected from a first signal point constellation and said second transmitted signal points are selected from a second signal point constellation that has fewer signal points than said first signal point constellation.

11. The invention of claim 10 wherein said first signal point constellation is partitioned into a plurality of receiver subsets of signal points, wherein the step of forming decisions as to said first transmitted signal points is a function of that partitioning, and wherein said second signal point constellation is comprised of a plurality of signal points separated by a minimum distance, said minimum distance being no less than an intra-subset minimum distance of said subsets.

12. The invention of claim 11 wherein said step of forming decisions as to said first transmitted signal points includes the step of
    decoding said first transmitted signal points using a path-oriented joint decoder/DFE.

13. A method of decoding a packet of signal points comprising the steps of
    decoding first ones of said signal points of the packet in such a way as to achieve a first level of reliability for these signal points, said first level being achieved at least in part by providing said first signal points with a particular form of error immunity enhancement, and
    decoding second ones of said signal points of the packet in such a way that, said second signal points allow this decoding step to achieve a second level of reliability for said second signal points, said second level being substantially no less than said first level but being achieved at least in part by providing said second signal points with a lesser amount of said particular form of error immunity enhancement.

14. The invention of claim 13 wherein said first signal points are selected from a first predetermined signal point constellation, said first constellation being partitioned into a plurality of subsets of signal points, said first signal points being decoded in the first said decoding step using that partitioning, and wherein said second signal points are selected from a second predetermined signal point constellation, said second constellation being comprised of a plurality of signal points separated by a minimum distance, said minimum distance being no less than an intra-subset minimum distance of said subsets of said first constellation.

15. The invention of claim 14 wherein said second signal points occur at predetermined positions within said packet.

16. The invention of claim 15 wherein particular form of error immunity enhancement is conversion gain.

17. The invention of claim 16 wherein said second constellation has fewer signal points than said first constellation.

18. The invention of claim 17 wherein said second signal points occur after said first signal points within said packet.

19. The invention of claim 18 wherein said decoding steps are performed using a path-oriented joint decoder/DFE.

20. A method for use in a decoder for decoding a stream of signal points received from a communication channel, said received signal points being corrupted by intersymbol interference and comprising a first portion selected from a first signal point constellation, said first signal point constellation being comprised of a plurality of receiver subsets of signal points, and a second portion selected from a second signal point constellation, each received signal point of said first portion having been selected from a respective one of a sequence of said receiver subsets, as defined by an N-state receiver trellis diagram, N being greater than or equal to 1, the method comprising the steps of generating in response to each received signal point a plurality of equalized signal points, each equalized signal point being generated as a function of a respective estimate of the intersymbol interference component of said each received signal point, each estimate being a function of a respective present surviving path of said decoder, identifying, as a function of the set of equalized signal points, successive sets of M surviving signal point paths through a receiver trellis defined by said N-state receiver trellis diagram, said identifying being such that more than one path leading to the same state can be identified as ones of the surviving paths, and forming decisions as to the identities of said received signal points as a function of at least one of said surviving paths, said second signal point constellation being such that the minimum distance between the signal points of said second signal point constellation is no less than an intra-subset minimum distance of said receiver subsets.

21. The invention of claim 20 wherein said second portion signal points occur at predetermined positions within said stream.

22. The invention of claim 21 wherein said second portion signal points occur in said stream after said first portion signal points.

23. The invention of claim 20 wherein said second constellation has fewer signal points than said first constellation.

24. A method for use in a decoder for decoding a stream of signal points received from a communication channel, said received signal points being corrupted by intersymbol interference and comprising a first portion selected from a first signal point constellation, said first signal point constellation being comprised of a plurality of transmitter subsets of signal points, and a second portion selected from a second signal point constellation, each received signal point of said first portion having been selected from a respective one of a sequence of said transmitter subsets, as defined by an N-state transmitter trellis diagram, N being greater than or equal to 1, the method comprising the steps of generating in response to each received signal point a plurality of equalized signal points, each equalized signal point being generated as a function of a respective estimate of the intersymbol interference component of said each received signal point, each estimate being a function of a respective present surviving path of said decoder, identifying, as a function of the set of equalized signal points, successive sets of M surviving signal point paths through a receiver trellis defined by an N-state receiver trellis diagram, said receiver trellis diagram including a plurality of branches between current and next states, said branches being associated with respective receiver subsets, each receiver subset being a part of a particular transmitter subset, said identifying being such that more than one path corresponding to a particular one of said sequences can be identified as ones of the surviving paths, and forming decisions as to the identities of said received signal points as a function of at least one of said surviving paths, said second signal point constellation being such that a minimum distance between the signal points of said second signal point constellation is no less than an intra-subset minimum distance of said receiver subsets.

25. The invention of claim 24 wherein said second portion signal points occur at predetermined positions within said stream.

26. The invention of claim 25 wherein said second portion signal points occur in said stream after said first portion signal points.

27. The invention of claim 24 wherein said second constellation has fewer signal points than said first constellation.

28. A method of processing a stream of signal points received from a channel, said stream being comprised of first and second portions, each signal point of said stream having been transmitted over said channel during a respective signaling interval, signal energy of said each signal point being dispersed into adjacent signaling intervals, said method comprising the step of forming a decision, responsive to said each transmitted signal point, as to the identity of that transmitted signal point, said decision as to the identity of each transmitted signal point of said first portion being a function of said dispersed signal energy from a number of said adjacent signaling intervals, and said decision as to the identity of each transmitted signal point of said second portion being a function of said dispersed signal energy from a smaller number, including none, of said adjacent signaling intervals, said second portion of said stream being transmitted in such a way that the decisions formed as to the identities of the signal points of said second portion are as likely to be correct as the decisions formed as to the identities of the signal points of said first portion.

29. The invention of claim 28 wherein said first portion is selected from a first signal point constellation and said second portion of said signal points is selected from a second signal point constellation that has fewer signal points than said first signal point constellation.

30. The invention of claim 29 wherein said second portion signal points occur at predetermined positions within said stream.

31. The invention of claim 30 wherein said first signal point constellation is partitioned into a plurality of receiver subsets of signal points, that partitioning being used in said step of forming decisions as to the identities of the first portion signal points, and wherein said second constellation is comprised of a plurality of signal points separated by a minimum distance, said minimum distance being no less than an intra-subset minimum distance of said subsets.

32. The invention of claim 31 wherein said second portion signal points occur within said stream after said first portion signal points.

33. A method comprising the steps of transmitting to a receiver an initial portion of a stream of signal points of a signal point packet of predefined length in such a way as to provide said initial signal points, as transmitted, with a first level of error immunity, and transmitting to said receiver a remaining, terminal portion of said stream of signal points in such a way as to provide said remaining signal points, as transmitted, with a second level of error immunity greater than said first level, whereby upon said stream being decoded in a receiver which provides a particular type of error immunity enhancement for said initial signal points but less such error immunity enhancement for said terminal signal points, the difference between the error rates for said initial signal points and said terminal signal points, as decoded, is less than it would have been if said terminal signal points, as transmitted, had been provided with said first level of error immunity.

34. The invention of claim 33 wherein said initial portion signal points are selected from a first signal point constellation and said terminal signal points are selected from a second signal point constellation that has fewer signal points than said first signal point constellation.

35. The invention of claim 34 wherein said first signal point constellation is partitioned into a plurality of receiver subsets of signal points, wherein the step of transmitting said initial portion signal points is a function of that partitioning, and wherein said second signal point constellation is comprised of a plurality of signal points separated by a minimum distance, said minimum distance being no less than an intra-subset minimum distance of said subsets.

36. A method for use in a data communication system in which packets of signal points are transmitted to a decoder, said decoder being such that it provides a particular form of error immunity enhancement for initial signal points of each packet but less such error immunity enhancement for the remaining signal points of that packet, the method comprising the steps of transmitting the initial signal points of each packet to the decoder in such a way as to provide them with a first level of error immunity, and transmitting the remaining signal points of each said packet to the decoder in such a way as to provide them with a second level of error immunity sufficiently greater than said first level that the error rate performance of said decoder is at least as great relative to said remaining signal points as it is for said initial signal points.

37. The invention of claim 36 wherein said initial signal points are selected from a first signal point constellation and said remaining signal points are selected from a second signal point constellation that has fewer signal points than said first signal point constellation.

38. The invention of claim 37 wherein said first signal point constellation is partitioned into a plurality of receiver subsets of signal points, wherein the step of transmitting said initial signal points is a function of that partitioning, and wherein said second signal point constellation is comprised of a plurality of signal points separated by a minimum distance, said minimum distance being no less than an intra-subset minimum distance of said subsets.

39. A method comprising steps of generating a first portion of a stream of signal points, each signal point of said first portion being selected from a first constellation, and generating a second portion of said stream, each signal point of said second portion being selected from a second constellation that is different from the first constellation, said signal points of said second portion occurring at predetermined positions within said stream, and wherein said generating a first portion includes encoding said first portion signal points, said first constellation being partitioned into a plurality of transmitter subsets of signal points, said encoding being a function of the partitioning, and wherein signal points of said second constellation are separated by a minimum distance that is no less than an intra-subset minimum distance of said subsets.

40. The invention of claim 39 wherein said second constellation has fewer signal points than said first constellation.

41. The invention of claim 39 wherein said second portion signal points occur in said stream after said first portion signal points.

* * * * *